Dec. 17, 1963

A. G. BOLDRIDGE, JR 3,114,268

ELECTRON BALLISTIC ACCELEROMETER

Filed Sept. 1, 1961

INVENTOR.
AUSTIN G. BOLDRIDGE, JR.
BY Albert J. Kronman
ATTORNEY

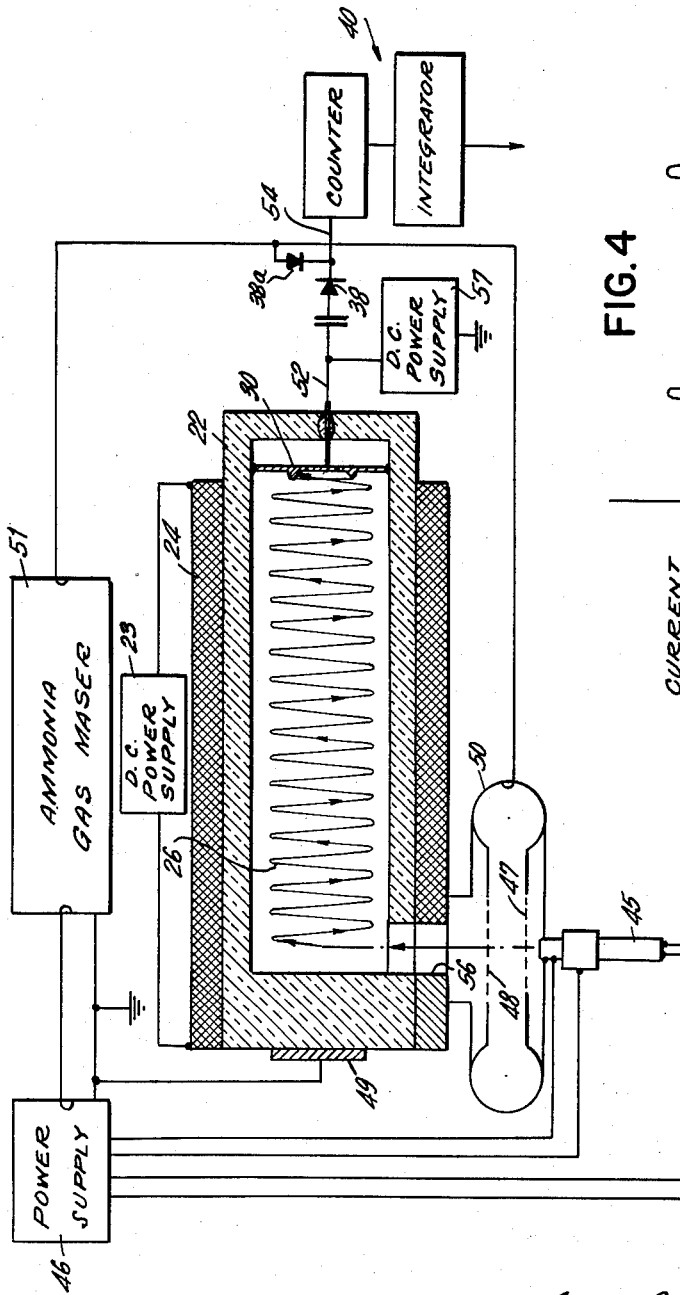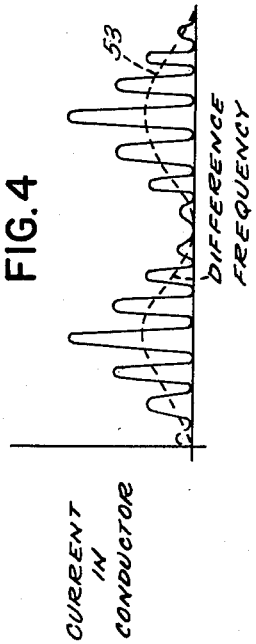

United States Patent Office 3,114,268
Patented Dec. 17, 1963

3,114,268
ELECTRON BALLISTIC ACCELEROMETER
Austin G. Boldridge, Jr., Ridgewood, N.J., assignor to Joseph J. Mascuch, Millburn, N.J.
Filed Sept. 1, 1961, Ser. No. 135,639
12 Claims. (Cl. 73—517)

This invention relates to an accelerometer for determining the acceleration of a moving vehicle along a predetermined line of motion. It has particular reference to an accelerometer using the inertia of a helical beam of electrons to determine the amount of acceleration. The beam of electrons is compared with a beam of light generated by a ruby laser and modulated by the generation of the electron beam at a cathode.

Many types of accelerometers have been designed and built for determining the acceleration of moving bodies. Some of these instruments are used with inertial guidance systems for determining the velocity and distance traveled by a vehicle. Many of the mechanical arrangements for determining acceleration are quite complex and costly and and all are subject to the force of gravity which enters as an undesirable error. All the mechanical systems have the disadvantage of introducing a considerable lag in the system because they operate slowly and take a considerable time before an accurate reading is available. The accelerometer described herein is small, fast acting, and gives results that are practically instantaneous. One of the objects of this invention is to provide an improved accelerometer which avoids one or more of the disadvantages and limitations of prior art arrangements.

Another object of the invention is to obtain a measurement of acceleration which is practically instantaneous.

Another object of the invention is to provide an accelerometer whose reading does not depend upon variations of most of the applied potentials.

Another object of the invention is to provide an accelerometer which is small in size, low in weight, and which is practically independent of large overloads.

The invention includes an accelerometer comprising a source of light which emits a light beam having a wave front of common phase. The beam is directed toward a cathode which generates electrons in quanta and discharges groups of electrons into one end of a drift tube in a vacuum at right angles to the tube axis. The other end of the tube contains an anode. The groups of electrons are emitted periodically and when they reach the anode they generate a sub-multiple frequency of the light frequency. Magnetic means are arranged adjacent to the drift tube for forming a magnetic field in axial alignment therewith to direct the beam of electrons into a helix which travels down the drift tube in a path having considerable length. The helical electron beam can be arranged to take about one millisecond to traverse the drift tube which may be 10 centimeters long.

The light beam also travels the length of the drift tube (in a straight axial line) and strikes a photoelectrode. The light beam is modulated when it generates the electron groups and therefore has the same modulation frequency. The electrical currents produced by the anode and the photoelectrode at the end of the drift tube are combined and applied to an integrator and a frequency meter for the determination of acceleration.

For a better understanding of the present invention, together with other and further objects thereof, reference is made to the following description taken in connection with the accompanying drawings.

FIGURE 3 is a cross sectional view of an alternate form of the drift tube. This form uses an electron gun and a cavity resonator to form the electron bunches.

FIGURE 4 is a graph of the combination of currents flowing into one of the amplifier units.

Figure 2:
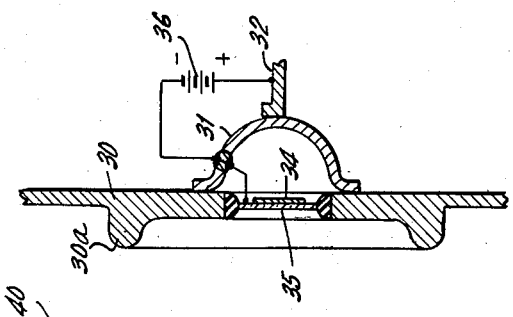
FIGURE 2 is a cross sectional view of the end of the drift tube shown in FIGURE 1 somewhat enlarged and shows the details of the anode and the photoelectrode.
Figure 1:
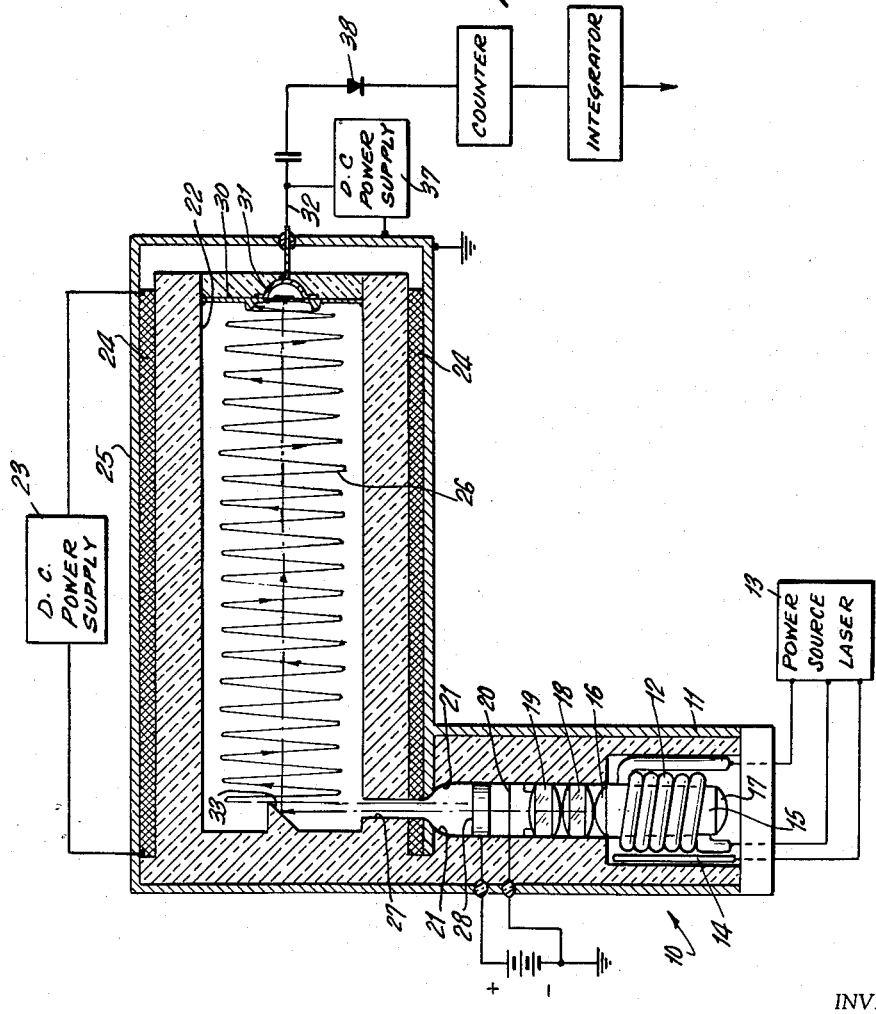
FIGURE 1 is a side view, with some parts in section, of the accelerometer showing the drift tube and the light generator.

Referring now to the figures, the accelerometer shown in FIGURES 1 and 2 includes a source of light 10 enclosed within a housing 11 and activated (or "pumped") by a helical gaseous discharge lamp 12. The lamp may be connected to a power supply 13 which provides the usual high voltage necessary for supplying such a tube with electric power. A starting electrode 14 may be employed for starting the lamp. The discharge tube 12 surrounds a ruby crystal 15 have about 2.5% of chromium. The ruby crystal has a cylindrical shape and its ends are ground in the form of parabolic surfaces for the accurate reflection of light within the ruby crystal. The ends of the crystal may be flat but it is believed that coherent light of greater purity is generated when the ends are parabolic. The ground ends 16 and 17 of the crystal 15 are each covered with a reflecting coating so that light generated within the crystal may be reflected back and forth between the ends in a thin concentrated beam. The coating on end 16 is designed to permit a portion of the light to pass through and this beam is further collimated by lenses 18 and 19 which are preferably formed from pieces cut from the same original ruby crystal out of which the laser crystal was cut.

The light generator 10 is termed a "laser" which is an acronym for Light Amplifier by Stimulated Electronic Radiation. The ruby crystal is activated by intense light from the gaseous discharge device 12 and because of this activation, chromium atoms within the crystal are energized sufficiently to cause light to be generated within the crystal and, after multiple reflection from the crystal ends 16 and 17, an intense beam is directed to the lenses 18 and 19 and then applied to a photoelectric cathode 20 in the entrance cavity 21 which adjoins drift tube 22.

The light beam emitted by the crystal 15 is different from all other forms of light beams since all the wave fronts are in common phase relationship similar to the electromagnetic radiation from antennas. Such a beam has been called a "coherent quantum train" and this beam has a frequency band width which is quite narrow, approximately ten cycles per second in width.

The base of the photoelectric cathode 20 is quite thin and may be made of fused quartz .001 inch thick onto which a one molecular monolithic layer of silver has been deposited by evaporation. On this conductive base a cesium crystal one molecule thick is deposited. As the coherent light beam passes through this diaphragm-like structure 20, a portion of it is absorbed and electrons are emitted. It is well known that electrons are emitted from a monomolecular monolithic layer in a linear manner by incident photons having an energy and flux density above known minimum values. These values may be computed by Einstein's equation $\frac{1}{2}mv^2 = hv - e\phi$. Because of the ordered structure of monolithic cesium, groups of electrons are emitted from photocathode 20 and occur at a frequency which is only about one-hundredth of the coherent light frequency. The drift tube 22 is made of a non-conductor, such as quartz, and is surrounded by a winding 24 which is connected to a source of direct current power 23. The current in winding 24 produces a longitudinal magnetic flux and causes the emitted electrons to progress down the tube in a helical path. The helix is represented in FIGURE 1 by the arrows 26 and its form depends upon the strength of the magnetic field, the emission velocity which depends upon the work function of the cesium, and the anode voltage which tends to pull the electrons along the axis of the tube.

The quartz drift tube 22 and the winding 24 are encased in a grounded metallic shield 25 which protects the components and shields the electron stream from external static and electromagnetic fields.

The electrons emitted by photocathode 20 have velocities and directions that vary considerably. Because the conduit 27 leading into the drift tube 22 is relatively narrow, only those electrons which are directed along an axial path will reach the drift tube 22. To insure passage into the drift tube, a ring shaped acceleration electrode 28 is mounted above the photocathode surface and supplied with a positive voltage which speeds up the electron bunches and delivers them to the drift tube 22 with a uniform speed. All of the electrons emitted in a direction which is not in alignment with conduit 27 will strike the walls of cavity 21 and eventually be absorbed.

The electron bunches reaching drift tube 22 will be acted upon by the axial magnetic field and a force whose direction is mutually perpendicular to the magnetic field and the electron direction. This force changes the direction of the electrons but not their velocity, with the result that the electron groups move in a helical path defined by a radius such that the magnetic force balances the centrifugal force of the circular motion.

The expression for the radius of the circular path obtained by equating the magnetic and centrifugal force is:

$$r = \frac{m_e v}{e\beta}$$

where:

$r$ = radius of circular path in centimeters.
$e$ = electron charge = $1.59 \times 10^{-20}$ abcoulomb.
$m_e$ = electron mass = $9.038 \times 10^{-28}$ grams.
$v$ = electron velocity in centimeters per second.
$\beta$ = magnetic field in lines per square centimeter.

The above equation may be expressed in practical units, with the square root of the potential substituted for velocity. The radius of the helix is then given by:

$$r = \frac{3.37\sqrt{E_a} \sin \theta}{\beta}$$

where $E_a$ = injection acceleration potential. The pitch ($p$) is formed by injecting an electron into a uniform magnetic field is:

$$p = \frac{2.12 \times 10' \sqrt{E_a} \cos \theta}{\beta}$$

If $\theta = 90$ degrees, $\cos \theta = 0$, and $P \rightarrow 0$

The acceleration experienced by the electron along the axis is:

$$\alpha = eF$$

where F is the potential gradient in statvolts per centimeter. The time ($t$) in seconds taken for an electron to move over a distance of $d$ centimeters is:

$$t = \sqrt{\frac{2md}{eF}}$$

therefore the distance traveled by an electron in time $t$ is:

$$d \text{ (centimeters)} = \frac{eFt^2}{2m}$$

In each case $t$ is the time for an electron to start from rest and to move a distance $d$ due to a field F.

The motion of an electron injected into a magnetic field at an angle to the field can be analyzed by resolving its initial velocity into components parallel and perpendicular to the field. The component parallel to the magnetic field is not acted upon by any force due to the field and so is unchanged in either magnitude or direction. The component normal to the field is subject to a constant sidewise force and hence undergoes the same change in direction as that described above, giving rise to a circular component of motion. The combination of circular and linear motion gives rise to a helical path. The equations given above are directly applicable to the circular component of motion if the normal component of velocity is substituted for the velocity magnitude.

The above analysis is made on the assumption of a uniform magnetic field. With a strong field the electron groups move in a tightly wound helix even if the magnetic lines be slightly curved. This analysis proves that the electron groups travel down the drift tube in a helical path provided that the strength of the electric field is low.

At the other end of the drift tube is a receiving arrangement which transforms the electron groups into a first train of electrical pulses and the modulated light beam into a second train of pulses. One simplified arrangement includes an annular anode 30 (see FIGURE 2) surrounding a photocathode surface 34. Since the electron bunches travel in a helix, they will strike only the annular anode surface and cause the usual currents to flow in the associated conductors 31 and 32.

The photoelectric cathode surface 20 does not absorb all the light generated by the laser 10 and a large proportion of it passes through the cesium layer and through the conduit 27 to the axis of the drift tube 22 where it is reflected by a small mirror 33, and directed in an axial direction toward a photocathode surface 34 (see FIGURE 2) deposited on a quartz disc 35 and similar in construction to the photocathode 20. The silver backing of the cesium layer is connected to an external source of potential 36 to create an electric field between the cesium surface and the cap shaped conductor 31.

The light beam from the laser 10 is modulated by the photosurface 20 when the bunches of electrons are emitted. During each group emission the ejection of a quantum of electrons from the photo-sensitive surface produces sufficient atomic change to alter the light transmission qualities of the cesium layer and therefore the light beam is modulated at the same frequency as the modulation frequency of the electron stream. The light modulation frequency is constant and is not affected by movements of the drift tube. The currents produced by the photocathode 34 contains similar modulation frequencies and this current is applied to counter and integrator circuits 40 for indicating the acceleration, velocity, and distance, traveled by the accelerometer. The electron groups, traveling in a helical path, are absorbed by anode ridge 30a maintained at a small positive potential by a power supply 37 which must be regulated. During the operation of the device at rest, the frequency of the light modulation is the same as the frequency of the current produced by the electron bunches and there will be no "difference frequency" available for the computing circuits. However, if the device is given an acceleration to the right or left, as shown in FIGURE 1, a greater (or less) number of electron bunches will strike anode 30 per unit of time and the resultant frequency will rise or fall. This combination of frequencies, when rectified by diode 38, produces the usual sum and difference frequencies which are applied to the computing and indicating circuits 40.

Any system of measurement which detects and records the change of phase and change of frequency can be employed by the circuits 40. For very low accelerations a phase indicator is the most sensitive and indicates acceleration directly. For very high accelerations the change in frequency is the most practical means of measurement and it will be evident that an integration circuit is necessary to determine the acceleration if frequency difference is detected. Phase change circuits and integration devices are well known in the art and need not be described here. The accelerometer shown in FIGURE 3 derives its train of electrons from a velocity modulation arrangement similar to part of the well known "Klystron." The drift tube 22 and its associated winding 24 are the same as shown in FIGURE 1 except the anode 30 does not have a photosensitive surface since it receives only electrons. The electrons are emitted from a hot cathode enclosed in an electron gun 45, having the usual focusing electrodes supplied by a power supply 46. The electron stream is directed through two grids 47 and 48 which are connected respectively to the two edges of a cavity resonator 50. The resonator is fed by a generator of high frequency power 51 which in this application may be an ammonia gas maser which generates electrical power at a frequency of 24 km. cycles. The two grids 47 and 48 modulate the electrons passing through the field between them and alter their velocity. The modulated electron stream is directed through a conduit 56 and enters the drift tube 22 at right angles to its axis. As soon as the electrons enter the drift tube they are forced into a helical path 26 by the axial field formed by winding 24 and current from power supply 23. The electrons are also acted upon by an axial electric field which exists because of grounded electrode 49, anode 30, and the direct current power supply 57. This field forces the electrons down the drift tube for collection by anode 30. After the electron stream has proceeded down the drift tube 22 the different velocities of the electrons produce bunching at the anode 30 and, if the tube is stationary, the same frequency is produced in the anode conductor 52 as was applied to the resonator 50.

The use of a focused beam of electrons is of importance because the electron lens system can be adjusted to converge the electrons to a focal area when they arrive at the anode and thus eliminate the natural tendency of the beam to diverge.

The output of the gas maser 51 is first rectified and then added to the rectified output from the drift tube anode 30. The two half-wave frequencies combine and produce the difference frequency 53 applied to the counter and integrating circuits 40 by means of conductor 54. As long as the drift tube remains stationary, the frequencies will be the same but, if the tube 22 is accelerated to the right or left, the helical path 26 will expand or contract like a spring under pressure and, during the change, the frequency of the arrival of the electron groups at the anode 30 will also change. This produces a frequency in conductor 52 which is different from the frequency applied from maser 51 and the difference frequency can be obtained by rectifying the combination by single diode 38, 38a, in each line as shown in FIGURE 3, or by any type of rectifying arrangement connected in series with conductor 54. As before, the change of phase or the change in frequency is proportional to the acceleration.

It is evident that a vehicle containing the accelerometer and given a constant acceleration will result in a modified helical path but, if the acceleration is constant, the same number of electron groups per unit of time will be collected by the anode as entered the drift tube from the source. For this reason an integrator must be employed to record the frequency changes as the acceleration is changed. The integrator may be a digital counter using multivibrator circuits or any other type of electronic counting means which is well-known in the art. The output of this circuit is applied to an indicator means which may be a current meter or a recording instrument. It is obvious that the information supplied to the frequency meter may also be applied to a second integrator for the determination of velocity and to a third integrator for the determination of distance, this latter arrangement of circuits and devices being common to all accelerometer systems.

The alternate system shown in FIGURE 3 uses frequencies which are lower than the frequencies used in the system shown in FIGURES 1 and 2 and therefore is less sensitive than the first described system. The first system is the preferred system.

Both the above described systems provide an instant response when the acceleration is varied and because of this a control system using either of these accelerometers in a vehicle guidance arrangement is more reliable and safer to operate with little or no tendency to hunt.

Having thus fully described the invention, what is claimed as new and desired to be secured by Letters Patent of the United States is:

1. An accelerometer comprising; a drift tube for enclosing a stream of electrons, a cathode gun positioned at one end of the drift tube for generating a focused beam of electrons; velocity modulation means for separating the electrons stream into discrete groups, an anode mounted at the other end of the drift tube for collecting the electron groups and transferring them into electrical pulses, high frequency generating means for applying high frequency power to said velocity modulation means to control the modulation frequency, said generating means also coupled to said anode, a winding surrounding the drift tube for generating a magnetic field in axial alignment with the axis of the drift tube for driving the electron stream into a helical path, a source of direct current power connected between the anode and an electrode at the other end of the drift tube for providing an electric field therebetween, and circuit means for applying the current received from said anode and from said high frequency generating means to a utilization circuit.

2. An accelerometer as claimed in claim 1 wherein the current from the anode and generating means is applied to an integrating means which counts and records the frequency difference between the two currents.

3. An accelerometer according to claim 1 in which the high frequency generating means is an ammonia gas maser.

4. An accelerometer according to claim 1 in which the velocity modulation means is a cavity resonator and the high frequency generating means is an ammonia gas maser.

5. An accelerometer comprising means for generating a beam of coherent light, a first semi-transparent cathode positioned in the path of said beam for modulating the beam at a predetermined frequency and for generating a stream of electrons modulated at the same frequency, a drift tube for enclosing said stream of electrons and said beam of light, and having an entrance conduit at one end of the tube for receiving the light beam and the electron stream, and optical means for directing the light beam in an axial direction, an anode combination at the other end of the drift tube for intercepting both the beam of light and the stream of electrons, said combination including an annular conducting anode surrounding a second photo-electric cathode having a photo-emissive surface for generating electrons when activated by the light beam, means for generating a magnetic field in axial alignment with the axis of the drift tube for driving the beam of electrons into a helical path, and a direct current power supply for applying a voltage between the anode and said first photo-cathode.

6. An accelerometer as claimed in claim 5 wherein said means for generating a magnetic field includes a winding surrounding the drift tube and a direct current power supply connected to the terminals of the winding.

7. An accelerometer as claimed in claim 5 wherein an additional direct current power supply is provided for applying a potential between the second photo-cathode and the anode.

8. An accelerometer as claimed in claim 7 wherein said anode is coupled to the input circuit of an integrator for determining the frequency difference between the current created by the light beam and the current created by the electron stream.

9. An accelerometer as claimed in claim 7 wherein the second photo-cathode is mounted on a transparent base and is secured to the anode by insulation means, said base being mounted in the path of the light beam, and the photo-emissive surface being secured to said base on the light exit side thereof.

10. An accelerometer as claimed in claim 7 wherein the coherent light beam generator is mounted at one side of the drift tube and directs the beam through the conduit to an axially mounted mirror in the drift tube.

11. An accelerometer as claimed in claim 8 wherein said integrator is connected to a counter circuit adapted to count and record the shift in frequency values during a change in axial acceleration of the drift tube.

12. An accelerometer as claimed in claim 8 wherein said source of coherent light includes a ruby laser.

References Cited in the file of this patent

UNITED STATES PATENTS

| | | |
|---|---|---|
| 2,457,620 | Abraham | Dec. 28, 1948 |
| 2,641,458 | Gilvarry | June 9, 1953 |
| 2,718,610 | Krawinkel | Sept. 20, 1955 |